Patented Nov. 22, 1932

1,888,484

UNITED STATES PATENT OFFICE

ARSEN H. AVAKIAN, OF LONG BEACH, CALIFORNIA

PROCESS OF PRECIPITATING SILICA FROM SOLUTION IN ALKALI BRINES

No Drawing.     Application filed November 28, 1930.  Serial No. 498,906.

This invention relates to an improvement in the art of producing sodium bicarbonate from alkali brines and more specifically to a process for precipitating silica from solution in the alkali brines.

Alkali brines from lake beds and similar places have a considerable amount of silica held in solution in the concentrated brine. When the brine is treated with carbon dioxide gas to produce the sodium bicarbonate the silica is precipitated out with the sodium bicarbonate crystals and it is impossible to separate them by any practical means and the purity of the final product is greatly reduced.

The principal object of this invention is to provide a practical means of precipitating the silica out of the brine so that sodium bicarbonate produced from the brine will be practically free from silica.

Another object of this invention is to provide a cheap, simple and easily utilized means of removing the silica from the brine solution.

Another object of this invention is to provide a means of removing the silica from a brine solution which will be readily adapted to the commercial methods commonly employed in the manufacture of sodium bicarbonate from the brine.

Other objects and advantages of the invention will be apparent to those skilled in the art, from the following description and claims.

In the production of sodium bicarbonate from alkali brines commercially the brine is treated with carbon dioxide gas and the resulting crystals of sodium bicarbonate are separated from the brine by filtration. These crystals are washed free of water soluble impurities and then calcined in a rotary furnace. When silica is present in the brine the silica is precipitated with the sodium bicarbonate crystals and can not be separated from them by any practical commercial means. This greatly reduces the purity of the finished product as the silica is often present in considerable quantities.

I have found that if the brine containing the silica in solution is treated with carbon dioxide or carbonated in any other manner, some of which will be described later, to a point below that at which sodium bicarbonate crystals are precipitated from the solution, the silica will be precipitated from the solution as silica or silicic acid and boro-silicate if boron is present in the solution.

The following equation shows a typical reaction taking place in the precipitation of the silica:

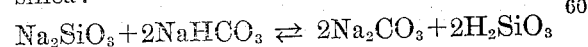

$$Na_2SiO_3 + 2NaHCO_3 \rightleftarrows 2Na_2CO_3 + 2H_2SiO_3$$

or the silicic acid may decompose partly or completely and form $SiO_2 + H_2O$ or the silica may combine with the borates forming insoluble borosilicates.

The indications are that the reaction in the first equation is reversible to a certain extent. The reversibility of the reaction is reduced to a minimum due to the influence of mass action induced by the presence of a large excess of the $HCO_3$ radicle.

A beneficial feature in the precipitation of the silica from the brines is the fact that the precipitate undergoes a change in its physical characteristics from a light, flocculent and somewhat gelatinous precipitate to that of a more crystalline and granular form. The precipitate in its first stage, that is when it first begins to coagulate after the treatment with the precipitating agent, is somewhat gelatinous in character and it is difficult to filter but on standing for a period of twenty-four hours or longer it acquires the crystalline or granular form. In this latter form it filters much more easily so that a half inch thick cake can be built on a suction filter and still the liquid will pass thru quite freely. Practically all the silica in the brine solution may be precipitated out in this manner before any perceptible amount of the sodium bicarbonate crystals are precipitated out. The silica may be filtered from the solution or the solution may be decanted off of the crystals after they have been allowed to settle in the treating tanks. In this way practically all the silica is removed from the brine that would precipitate during complete carbonation of the brine to precipitate the sodium bicarbonate from the brine and the final sodium bicarbonate produced is practically free of silica.

The silica is precipitated from the brine solution by the introduction of the $HCO_3$ radicle in any desired manner such as treating with carbon dioxide gas as previously described, the introduction of some of the mother liquor into the brine solution or by adding a concentrated solution of sodium bicarbonate or solid sodium bicarbonate or any other desired and convenient means, the only thing essential being the introduction of $HCO_3$ radical in sufficient quantity to precipitate the silica but not in sufficient quantity to precipitate the sodium bicarbonate to any appreciable degree.

This method is efficient in that all the silica is removed from the brine except 0.5 gram per liter of brine and only half of this is carried over with the sodium bicarbonate produced from the brine so that the impurity of the final product is negligible. The method is also practical in that it may be fitted into the present system of treating the brine without necessitating any changes or adding materially to the expense, as the only added cost is the mechanical handling and filtering of the solution.

This method is also inexpensive in the fact that all reagents introduced in the brine to precipitate silica are recoverable from the carbonation, for example if carbon dioxide is introduced in the brine to precipitate the silica it remains in solution in the brine and in subsequent carbonation it will require a corresponding less amount of carbon dioxide to complete the carbonation. If some form of bicarbonate is introduced in the brine up to the point of saturation of the brine with the bicarbonate then in subsequent carbonation the resulting mother liquor will hold in solution a correspondingly less amount of the bicarbonate crystallized out.

Having described my invention so that it is easily understood by any one skilled in the art, I claim:

1. The method of removing silica from the salts of brine solutions which comprises producing the $HCO_3$ radical in the solution and mechanically separating the precipitated silica from the brine.

2. The method of removing silica from the salts of a brine solution which comprises partially carbonating the solution and mechanically separating the precipitated silicates from the brine.

3. The method of removing silica from a brine solution which comprises partially carbonating the solution to a point where the alkali carbonates begin to precipitate slightly and mechanically separating the precipitated silicates from the solution.

4. The method of removing silica from a brine solution which comprises partially carbonating the solution to a point just below that at which the alkali carbonates are precipitated and mechanically separating the precipitated silicates from the solution.

5. The method of removing silica from a brine solution which comprises forming the $HCO_3$ radical in the solution to a point just below that at which the alkali corbonates are precipitated and mechanically separating the precipitated silica from the solution.

6. The method of removing silica from a brine solution which comprises forming the $HCO_3$ radical in the solution to the point where the alkali carbonates just begin to precipitate and mechanically separating the precipitated silicates from the solution.

7. The method of removing silica from the salts of a brine solution which comprises adding the $HCO_3$ radical to the solution and mechanically separating the precipitated silicates from the solution.

8. The method of removing silica from the salts of a brine solution which comprises adding mother liquor from the filtered bicarbonate to the solution and mechanically separating the precipitated silicates from the solution.

9. The method of removing silica from the salts of a brine solution which comprises adding a solid bicarbonate to the solution to the point of saturation and mechanically separating the precipitated silicates from the solution.

10. The method of removing silica from the salts of a brine solution which comprises adding a saturated solution of a bicarbonate to the solution and mechanically separating the precipitated silicates from the solution.

In testimony whereof I have signed my name to this specification.

ARSEN H. AVAKIAN.